US012133091B2

(12) United States Patent
Shaw et al.

(10) Patent No.: US 12,133,091 B2
(45) Date of Patent: *Oct. 29, 2024

(54) DIGITAL SIGNATURES FOR SMALL CELLS OF TELECOMMUNICATIONS NETWORKS

(71) Applicant: T-Mobile USA, Inc., Bellevue, WA (US)

(72) Inventors: Venson Shaw, Kirkland, WA (US); Gaviphat Lekutai, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/313,917

(22) Filed: May 8, 2023

(65) Prior Publication Data
US 2023/0276259 A1    Aug. 31, 2023

Related U.S. Application Data

(63) Continuation of application No. 17/121,537, filed on Dec. 14, 2020, now Pat. No. 11,683,700.

(51) Int. Cl.
H04L 9/40 (2022.01)
H04W 12/06 (2021.01)
H04W 16/32 (2009.01)
H04W 48/18 (2009.01)

(52) U.S. Cl.
CPC ......... *H04W 16/32* (2013.01); *H04L 63/1416* (2013.01); *H04L 63/1425* (2013.01); *H04W 12/06* (2013.01); *H04W 48/18* (2013.01)

(58) Field of Classification Search
CPC ..... H04W 16/32; H04W 12/06; H04W 48/18; H04W 12/12; H04W 24/02; H04W 24/04; H04L 63/1416; H04L 63/1425
See application file for complete search history.

(56) References Cited

U.S. PATENT DOCUMENTS

| | | | |
|---|---|---|---|
| 6,763,519 B1 | 7/2004 | McColl et al. | |
| 8,464,056 B2 | 6/2013 | Poledna | |
| 8,578,381 B2 | 11/2013 | Podila | |
| 8,789,158 B2 | 7/2014 | Mansour et al. | |
| 8,909,917 B2 | 12/2014 | Stuber | |
| 9,197,624 B2 | 11/2015 | Mansour et al. | |
| 9,351,312 B2 | 5/2016 | Reial et al. | |

(Continued)

*Primary Examiner* — Farid Homayounmehr
*Assistant Examiner* — Mudasiru K Olaegbe
(74) *Attorney, Agent, or Firm* — Perkins Coie LLP

(57) ABSTRACT

A security system generates a digital signature for a small cell of a wireless network and assigns the digital signature to the small cell for connecting to the wireless network. The digital signature can be generated based on a connectivity schedule for the small cell. When the security system obtains a connection request from the small cell to connect to the wireless network, the security system compares an instance of the digital signature included in the connection request with an expected digital signature and compares the point in time when the connection request was communicated with an expected time indicated in the connectivity schedule. The security system detects an anomaly when the instance of the digital signature deviates from the expected digital signature or the point in time deviates from the expected time, and causes performance of an action based on a type or degree of the anomaly.

20 Claims, 5 Drawing Sheets

(56) References Cited

U.S. PATENT DOCUMENTS

| | | |
|---|---|---|
| 9,439,092 B1 * | 9/2016 | Chukka ................ H04W 24/04 |
| 9,596,238 B2 | 3/2017 | Mansour et al. |
| 9,817,650 B2 | 11/2017 | Ronning et al. |
| 9,824,334 B2 | 11/2017 | Nudd |
| 10,178,643 B1 | 1/2019 | Ramamurthy |
| 10,405,344 B2 | 9/2019 | Shanmugaraju et al. |
| 2003/0041245 A1 | 2/2003 | Chan et al. |
| 2003/0195974 A1 | 10/2003 | Ronning et al. |
| 2003/0212992 A1 | 11/2003 | Ronning et al. |
| 2004/0005887 A1 | 1/2004 | Bahrenburg et al. |
| 2006/0168643 A1 * | 7/2006 | Howard ................ H04L 63/168 |
| | | 726/2 |
| 2009/0055859 A1 | 2/2009 | Knoller et al. |
| 2009/0113434 A1 | 4/2009 | Podila |
| 2009/0132339 A1 | 5/2009 | Sloo et al. |
| 2009/0228577 A1 | 9/2009 | Webb-Johnson |
| 2011/0066854 A1 | 3/2011 | Poledna |
| 2012/0216182 A1 | 8/2012 | Ronning et al. |
| 2012/0216265 A1 | 8/2012 | Mansour et al. |
| 2014/0273949 A1 * | 9/2014 | Duggan .............. H04W 12/122 |
| | | 455/410 |
| 2014/0325598 A1 | 10/2014 | Mansour et al. |
| 2015/0016350 A1 * | 1/2015 | Moulsley .......... H04W 72/0453 |
| | | 370/329 |
| 2015/0078302 A1 * | 3/2015 | Reial .................... H04W 72/54 |
| | | 370/329 |
| 2016/0087983 A1 | 3/2016 | Mansour et al. |
| 2016/0275796 A1 * | 9/2016 | Kim ...................... G08G 1/166 |
| 2017/0005515 A1 * | 1/2017 | Sanders .................. H02J 3/388 |
| 2018/0026792 A1 | 1/2018 | Ben Hamida et al. |
| 2018/0332614 A1 | 11/2018 | Shanmugaraju et al. |
| 2018/0352561 A1 | 12/2018 | Barabell et al. |
| 2019/0132740 A1 * | 5/2019 | De ...................... H04W 12/122 |
| 2020/0112911 A1 * | 4/2020 | Ozturk ................ H04W 48/12 |

* cited by examiner

DIGITAL SIGNATURES FOR SMALL CELLS OF TELECOMMUNICATIONS NETWORKS

CROSS-REFERENCE TO RELATED APPLICATIONS

This application is a continuation of U.S. patent application Ser. No. 17/121,537, filed on Dec. 14, 2020, entitled DIGITAL SIGNATURES FOR SMALL CELLS OF TELECOMMUNICATIONS NETWORKS, which is hereby incorporated by reference in its entirety.

BACKGROUND

In telecommunications, 5G is the fifth-generation technology standard for cellular networks, the successor to 4G networks, which provide connectivity to most current mobile phones. Like its predecessors, the service area of 5G networks is divided into geographical areas called cells. The wireless devices in a cell are connected to internet and telephone networks by radio waves through a local antenna of the cell. A main advantage of 5G networks is greater bandwidth, yielding higher download speeds, eventually up to 10 gigabits per second (Gbit/s). Due to the increased bandwidth, 5G networks can also serve as general Internet service providers (ISPs) and will make possible new applications in internet-of-things (IoT) and machine-to-machine (M2M) areas.

Small cells are low-powered cellular radio access nodes that operate in licensed and unlicensed spectrum and have a range of 10 meters to a few kilometers. They are "small" compared to conventional cells partly because they have a shorter range and partly because they typically handle fewer concurrent calls or data sessions. As carriers seek to densify existing wireless networks for the data capacity demands of 5G, small cells are currently viewed as a solution to allow re-using the same frequencies and as an important method of increasing cellular network capacity, quality, and robustness.

The small cells add to the numerous devices that create vulnerabilities for the network. Authenticating the computing devices that access 5G networks is imperative to securing the networks. For example, a digital signature can be used to verify the authenticity of digital asset. A valid digital signature, where prerequisites are satisfied, gives a network very strong reason to believe that a digital asset is known (authentication) and not altered (integrity). Digital signatures can employ asymmetric cryptography where both parties have access to public information required for authentication but only the authenticating party has access to a private information that is also required for authentication.

BRIEF DESCRIPTION OF THE DRAWINGS

Embodiments of the present technology will be described and explained through the use of the accompanying drawings.

Figure 1:
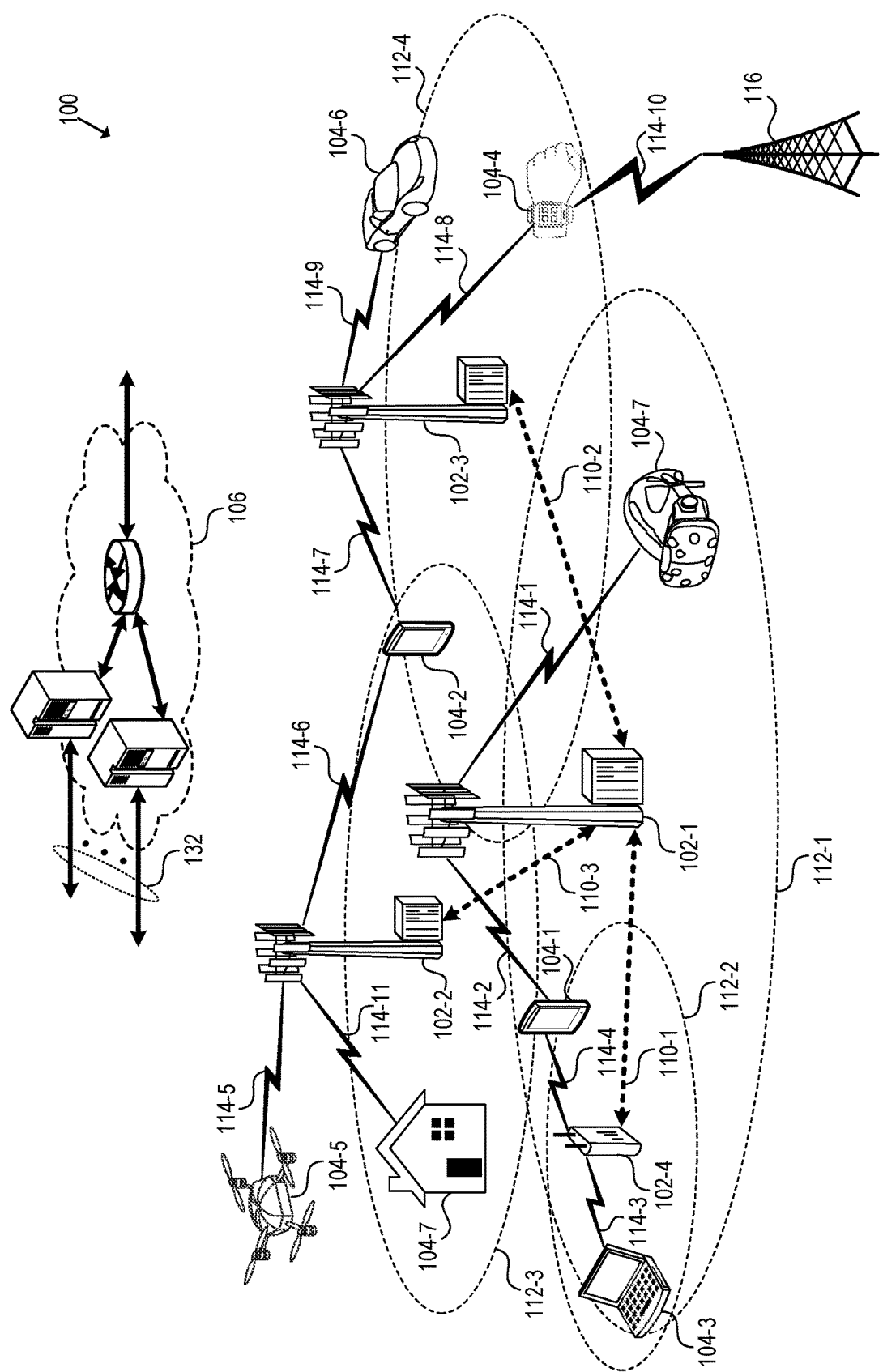
FIG. 1 is a block diagram that illustrates a wireless communications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technology relates to systems and methods for authenticating small cells with a wireless telecommunications network (e.g., 5G network). For example, a small cell can have a connectivity schedule that specifies times and/or durations during which the small cell connects to a network. In other words, the connectivity schedule establishes a time pattern when the small cell connects to transmit and/or receive any data or a particular type of data. In one example, the connectivity schedule can designate a periodic pattern (e.g., connect for two minutes every hour). In another example, a connectivity schedule is unique among a group of small cells to provide limited, minimally-overlapping connectivity with the network. As such, the network can reduce traffic congestion. The connectivity schedule can also dictate when small cells turn on/off or enter/exit a sleep mode, which would further conserve the small cell's resources (e.g., battery power). Thus, a connectivity schedule balances local resource demands while avoiding network congestion.

To authenticate a small cell, the small cell transmits a message including a digital signature ("signature") when attempting to establish a connection with the network. The message is transmitted in accordance with the small cell's connectivity schedule. For example, the small cell can communicate a connection request including a unique signature of the small cell to the network. That signature, along with an associated connectivity schedule for the small cell and other small cells, can be stored at a Unified Data Management (UDM)/User Data Repository (UDR) node of a 5G network. To authenticate the small cell, the network can determine whether (1) the correct signature for the small cell was received (2) at the expected time as indicated by the connectivity schedule stored at the UDM/UDR node. If the received signature matches the one stored in the UDM/UDR node for the small cell, and a timestamp associated with the signature satisfies a time constraint of the connectivity schedule, the small cell is authenticated. The network can deny a connection request and/or disable a small cell that fails to provide an expected signature (the correct signature) at an expected time according to the connectivity schedule. For example, the network can enable a temporary connection to send a command to the small cell, which disables the small cell.

The signatures of small cells can be generated from respective connectivity schedules. For example, the signature of a small cell can be generated by processing its unique connectivity schedule through a hashing algorithm at the time that the small cell is installed on the network. Hence, the signatures encrypt the connectivity schedules used to communicate with the network. Thus, authentication of a small cell by the network requires receiving an expected signature of a small cell at an expected time, which can be derived from the signature.

Embodiments include other features such as storing information about the connectivity schedules and signatures at the Radio Access Network (RAN) nodes, to authenticate small cells locally without using upstream resources. Further, a signature for a small cell can update in response to a changed connectivity schedule. That is, a signature that is based on one connectivity schedule can change when a based on an updated connectivity schedule. As such, the updated connectivity schedule is derivable from the updated signature but not necessarily from the prior signature.

The technologies can thus safeguard a network from malicious small cells and balance a network load with unique signatures that are based on connectivity schedules. The present technology can be incorporated into 3GPP or IEEE standards related to discontinuous transmission (DTX) protocols. Additional techniques are described in the assignee's related applications including U.S. patent application Ser. No. 16/874,649, filed May 14, 2020, titled "5G Cybersecurity Protection System Using Personalized Signatures," U.S. patent application Ser. No. 17/021,870, filed Sep. 15, 2020, titled "Visual Voicemail Centralized Authentication System for Wireless Networks," U.S. patent application Ser. No. 16/945,592, filed Jul. 31, 2020, titled "Cached Entity Profiles at Network Access Nodes to Re-Authenticate Network Entities," U.S. patent application Ser. No. 16/945,637, filed Jul. 31, 2020, titled "Connectivity Scheduler for NB-IoT Devices," U.S. patent application Ser. No. 17/007,782, filed Aug. 31, 2020, titled "Wireless Network That Discovers Hotspots for Cyberattacks Based on Social Media Data," U.S. patent application Ser. No. 16/849,158, filed Apr. 15, 2020, titled "On-Demand Security Layer for a 5G Wireless Network," and U.S. patent application Ser. No. 16/921,765, filed Jul. 6, 2020, titled "Security System for Managing 5G Network Traffic," each of which are incorporated by reference in their entireties for all purposes.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also includes wireless devices 104-1 through 104-8 (referred to individually as "wireless device 104" or collectively as "wireless devices 104") and a core network 106. The wireless devices 104-1 through 104-8 can correspond to or include network entities that are capable of communication using various connectivity standards. For example, a 5G communication channel can use millimeter waver (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Figure 2:
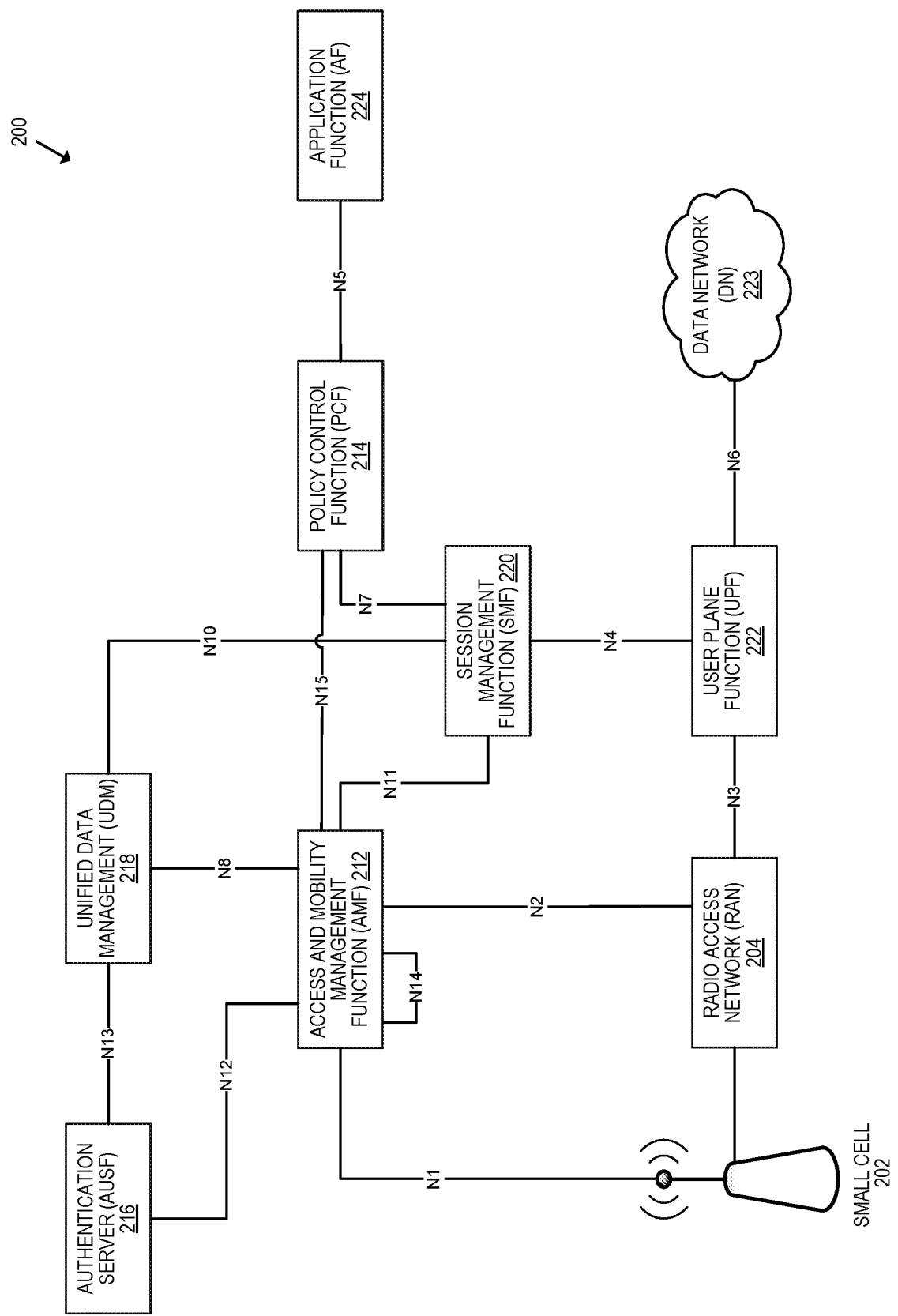
FIG. 2 is a block diagram that illustrates an architecture of network functions of a 5G network that can implement aspects of the present technology.

FIG. 2 is a block diagram that illustrates an architecture of network functions of a 5G network that can implement aspects of the present technology. A small cell 202 can access the 5G network via a RAN 204. The architecture of the network functions 200 includes an authentication server function (AUSF) 216, a UDM 218, an access and mobility management function (AMF) 212, a policy control function (PCF) 214, a session management function (SMF) 220, and a user plane function (UPF) 222. The PCF 214 can connect with one or more application functions (AFs) 224. The UPF 222 can connect with one or more data networks (DNs) 223. The interfaces N1 through N15 define the communications and/or protocols between each function or component, as described in relevant standards. The UPF 222 is part of the user plane and the AMF 212, SMF 220, PCF 214, AUSF 216, and UDM 218 are part of the control plane. The UPFs can be deployed separately from control plane functions and the network functions of the control plane are modularized such that they can be scaled independently.

A UDM 218 introduces the concept of user data convergence (UDC) that separates the UDR for storing and managing subscriber information from the frontend that processes the subscriber information. The UDM can employ UDC under 3GPP TS 22.101, which supports a layered architecture that separates user data from application logic in 3GPP systems. The UDM 218 is associated with a database (not shown) that can contain profile data for subscribers and/or other data that can be used to authenticate network entities. In one example, the UDM stores a signature of the small cell, as well as a connectivity schedule for the small cell 202 and other small cells (not shown). Given the large number of small cells that can connect to the 5G network, the UDM 218 contains voluminous amounts of data to authenticate the small cells. For example, each time that the small cell 202 seeks to connect to the 5G network, the UDM 218 receives an indication of the connection request and can authorize the connection by authenticating the signature and associated timestamp based on the data stored at the UDM.

Figure 3:
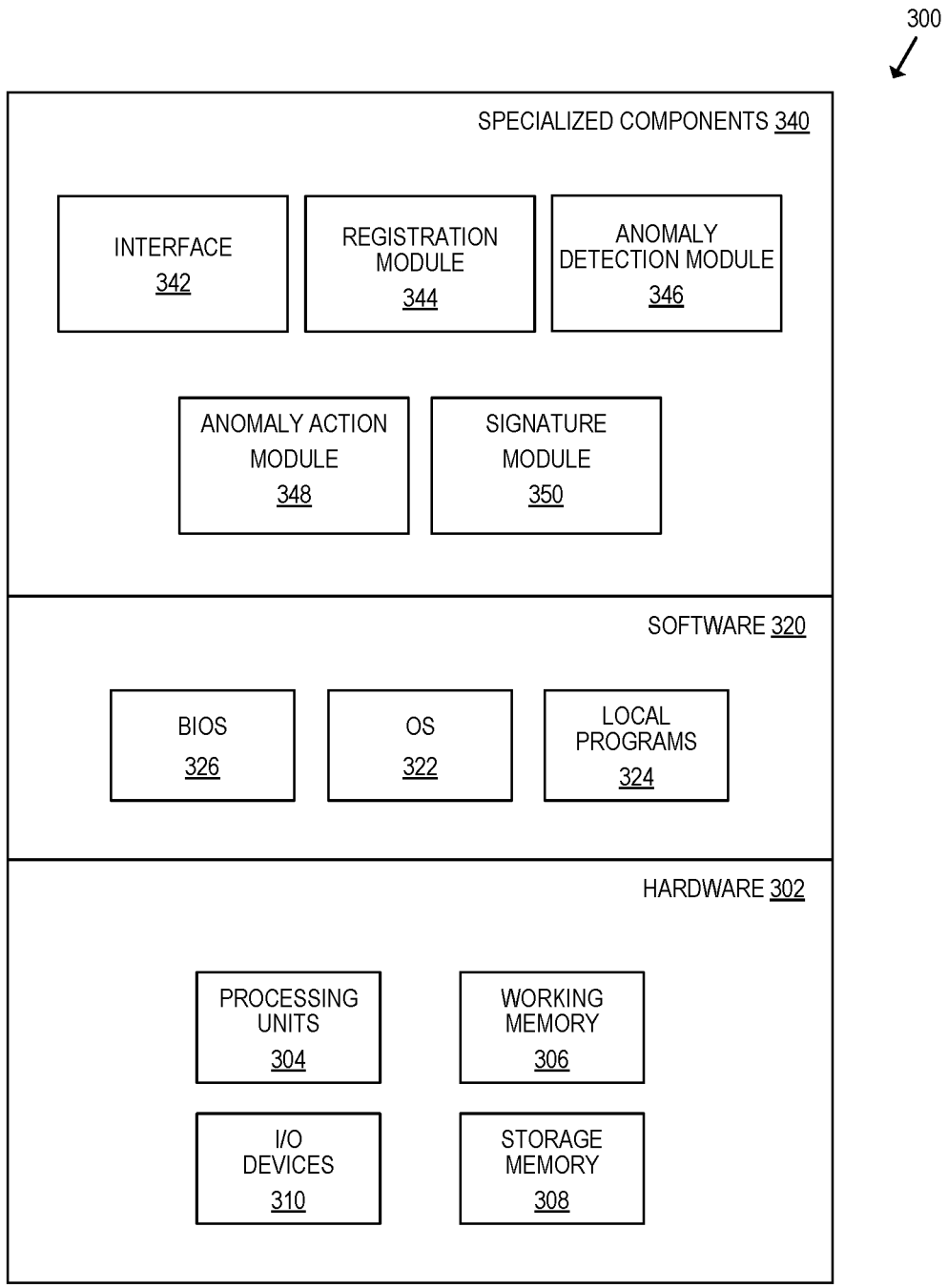
FIG. 3 is a block diagram that illustrates components of a security system that implements aspects of the disclosed technology.

FIG. 3 is a block diagram that illustrates components 300 of a security system ("system") that implements aspects of the disclosed technology. The components 300 can be implemented at one or more network nodes or computing devices associated with a network (e.g., 5G network). The components 300 include hardware 302, software 320, and specialized components 340. In some implementations, the components 300 are distributed across multiple network nodes or devices or can be an interface to a server-based application executing one or more of the specialized components 340.

Examples of the hardware 302 include processing units 304, working memory 306, storage memory 308, and input and output devices 310. Examples of the software 320 include applications, an operating system 322, local programs 324, and a basic input output system (BIOS) 326. The specialized components 340 can be sub-components of the software 320 (e.g., local programs 324). The specialized components 340 include a registration module 344, an anomaly detection module 346, a signature module 348, a deauthorization module 350, and components configured to transfer data and to control the specialized components 340, such as interface 342.

The registration module 344 processes a request to register a small cell with the network. Once registered, the small cell can connect to the network only if the small cell provides a connection request including an authorized signature. Once the small cell is authorized and connected to the network, the system can provide access to services for the small cell. To authorize the small cell, the network performs an access procedure to initiate communication and setup a connection with a network node by communicating the connection request of the small cell to the core network. After security protocols are completed, the data and a default Protocol Data Unit (PDU) session is setup, the connection process is complete, and data can flow in downlink and/or uplink directions. The registration module 344 can store at a database (e.g., UDM database) information that identifies the small cell and/or performance or operation information. Examples include a connectivity schedule, a serial number, a MAC address, a device, software, or operating system type or version, or metadata (e.g., regarding communications with supported wireless devices).

The signature module 350 generates signatures (e.g., device fingerprints) for small cells. In one example, a signature is a globally unique identifier including a serial number, MAC address, product ID, and/or other unique number. In another example, the signatures are programmatically or algorithmically generated identifiers. For example, a combination of unique or non-unique information (e.g., product ID, installation date, model number) about the small cell is processed through an encryption or hashing algorithm to generate a unique signature. A signature can be unique among two or more small cells of the network, to uniquely identify a small cell when the small cell seeks to establish a network connection. In one example, the signatures among a group of small cells are unique. The group can be defined based on a physical region where the small cells are located. A copy of each signature is stored at the small cell and a counterpart copy is stored by the registration module 344 with a device profile at the UDM database.

A signature and related metadata are used to detect a risk of a cyberattack posed to the network by a small cell. To further mitigate the risk of hacking the authentication protocol, a signature can be generated based on a connectivity schedule that is unique among two or more small cells of the network. The connectivity schedule can designate patterns for connection requests including a periodicity, dates, times, frequencies, periods, increments, etcetera for the small cell to communicate connection requests to the network. The pattern in which connection requests are sent can be determined based on a risk associated with the small cell. The risk can be determined by factors such as a type of small cell, a cost of the small cell, a location of the small cell, etc.

In one example, the connectivity schedules of small cells can be offset in a time domain to form different connectivity patterns for connecting to the network. Non-overlapping or minimally-overlapping connectivity patterns can reduce or minimize network congestion and/or communication interference. In one example, a connectivity schedule is processed through an encryption or hashing algorithm to generate a signature for a small cell. As such, the connectivity schedule is derivable from the signature. In one example, a network can store the decryption algorithm to extract connectivity schedules from signatures of two or more small cells when needed, thereby obviating the need to store connectivity schedules. For example, the network can store a decryption key for one, a group, or all small cells to process signatures and extract a connectivity schedule for any of the small cells. As such, a small cell can be authenticated based on the signature itself and the connectivity schedule extracted from the signature without needing to store any connectivity schedules on the network side.

Likewise, a small cell can store a decryption algorithm to derive its connectivity schedule for transmitting connection requests. In one example, the keys for the small cells are different from each other, and all the keys of the small cells are different from a master key stored at the network. As such, the network can extract the connectivity schedules of all the cells with the master key while each small cell can only extract its own connectivity schedule using its own key. Moreover, a small cell's key may unlock some but not all of its connectivity schedule whereas the master key can unlock more or all of the connectivity schedule. For example, a small cell's key can only unlock a next time to communicate a connection request such that times for past or future connection requests remain unknown to the small cell but not the network. Thus, a hacker of the small cell does not have immediate access to both the signature and connectivity schedule, which mitigates the risk that the hacker could immediately compromise the small cell to obtain access to the network. In some implementations, signatures are used only for small cells that pose a greater likelihood of a cyberattack (e.g., those located in remote or rural areas). In some implementations, a group of small cells share a common signature where one or more security policies are applied to the small cells based on groupings.

The signature module 350 can dynamically update a signature by using machine learning. As such, connectivity schedules can adapt to changing network conditions (e.g., network loads) that are learned via a machine learning algorithm. This trains the system to generate new connectivity schedules that optimize connections on the network to reduce interference or utilization. The signature module 350 then updates the signatures for small cells based on the updated connectivity schedules.

Therefore, a signature can be created by the network and/or the small cell and provided to the network when the small cell is registered with the network. In some implementations, the signature module 350 sets a connectivity schedule detailing when the network expects to receive the signature from the small cell (e.g., the small cell is expected to send the signature each hour on the hour). If the small cell does not send the signature at the scheduled times, the anomaly detection module 348 can determine a likelihood of a cyberattack and the anomaly action module 350 determines a type of action that is required to address the anomaly and a component for performing the action.

The anomaly detection module 346 can monitor for connection requests at times indicated in connectivity schedules or verify timely connection requests upon receiving the connection request and extracting connectivity information. When a signature is obtained, the system can compare the signature with a signature of the small cell stored in the UDM database. The anomaly detection module 346 can detect whether a received connection request deviates from an expected connection request. Deviating can include receiving connection requests at times other than expected times or receiving signatures other than expected signatures (e.g., wrong signatures). The risk of a cyberattack is determined based on a degree and type of deviation.

In one implementation, an anomaly is detected as a deviation of data or metadata relative to expected data or metadata. A deviation of a received signature relative to a copy of a stored signature constitutes an anomaly. For example, the anomaly detection module 346 can process a connection request to extract a signature and compare the signature to a copy stored at the UDM database. As such, the anomaly detection module 346 can confirm whether the small cell is secure based on whether the signature matches the stored copy and a timestamp associated with the connection request. The timestamp can indicate when the connection request was sent by the small cell, received by the network, or any other reference time. Hence, a deviation from a time when the connection request was expected in accordance with the connectivity schedule constitutes an anomaly. As such, the network can detect a risk for a cyberattack when the received signature is different from an expected signature and/or a time associated with the received signature differs from an expected time.

The anomaly action module 348 can classify the risk of an anomaly in terms of the severity or likelihood of a cyberattack (e.g., high, moderate, low). The system can perform different actions in response to a type or degree of an anomaly. Thus, the system can distinguish between anomalies and provision actions that address the anomalies. An appropriate action should address an anomaly with minimal interference to network operations. For example, an incorrect signature received at an unexpected time could indicate that a hacker has compromised a small cell whereas a correct signature received at an unexpected time could indicate faulty or obsolete software or hardware or physical damage to the small cell, which is not malicious. For a malicious anomaly, the system can deauthorize the small cell whereas an appropriate action to address a less risky anomaly can include generating an alert to a network operator.

The anomaly action module 348 can perform an action based on whether the anomaly detection module 346 detects an anomaly that satisfies one or more of the conditions. For example, receiving an incorrect signature can satisfy a condition that triggers an action to deauthorize the small cell from connecting to the network. In another example, receiving the correct signature a number of unexpected times that exceeds a threshold number (e.g., 10 times) similarly triggers an action to deauthorize the small cell. On the other hand, detecting the correct signature at fewer unexpected times can cause the anomaly action module 348 to trigger enhanced monitoring of the small cell rather than deauthorize the small cell. As circumstances change, so can the monitoring of the small cell. For example, the enhanced monitoring can be deactivated after receiving the correct signature consistently at multiple expected times that exceeds another threshold number. In some implementations, different nodes of the network can perform the monitoring based on availability, location or source of an anomaly, or the portion of the network most likely to perform deauthorization, should it be required. Thus, the system can dynamically allocate resources to perform actions that mitigate the risk of a cyberattack, update a risk assessment, and adjust resource allocation as circumstances evolve.

In some implementations, a detected deviation does not cause deauthorization but rather causes the anomaly action module 348 to evaluate or check other factors to determine whether conditions for deauthorization are met (e.g., similar small cells have caused cyber-attacks). The anomaly action module 348 can select a network component (e.g., core network, RAN, application server) to perform an action that addresses the detected anomaly. Examples of actions include turning the small cell to an off state, erasing content and settings of the small cell, disabling an application on the small cell, or temporarily disabling access of the small cell to the network.

For example, the anomaly detection module 346 can detect an anomaly to determine that a small cell is at a high risk of a cyberattack and, in response, cause the anomaly action module 348 to allocate a resource that erases content and/or settings from the small cell and identify other small cells that pose a similar risk. The deauthorization action can be performed by various parts of a network including the Core Access and Mobility Management Function (AMF) or a NAN that adds the small cell to a blacklist. In another example, if the threat of a cyberattack is moderate such that disabling a particular application on the small cell would reduce or eliminate a threat, the anomaly action module 348 can cause an application server to disable the application of the small cell.

In one implementation, one or more of the components 300 are located at a NAN (e.g., gNB) of a RAN to register a small cell, detect anomalous connection requests, and perform actions that thwart a cyberattack. As such, the risk of a cyberattack is further mitigated to stop anomalous connection requests at the edge of the network rather than allowing the connection requests to reach the core network. In some implementations, a NAN can send a message to the core network with characteristics (e.g., port number, type of device, provider of the device, manufacturer of the device, software version) of the small cell detected as being at risk. The core network can identify other small cells with the same or similar characteristics and create a coordinated anomaly action plan for small cells that are similarly susceptible to being hacked.

Figure 4:
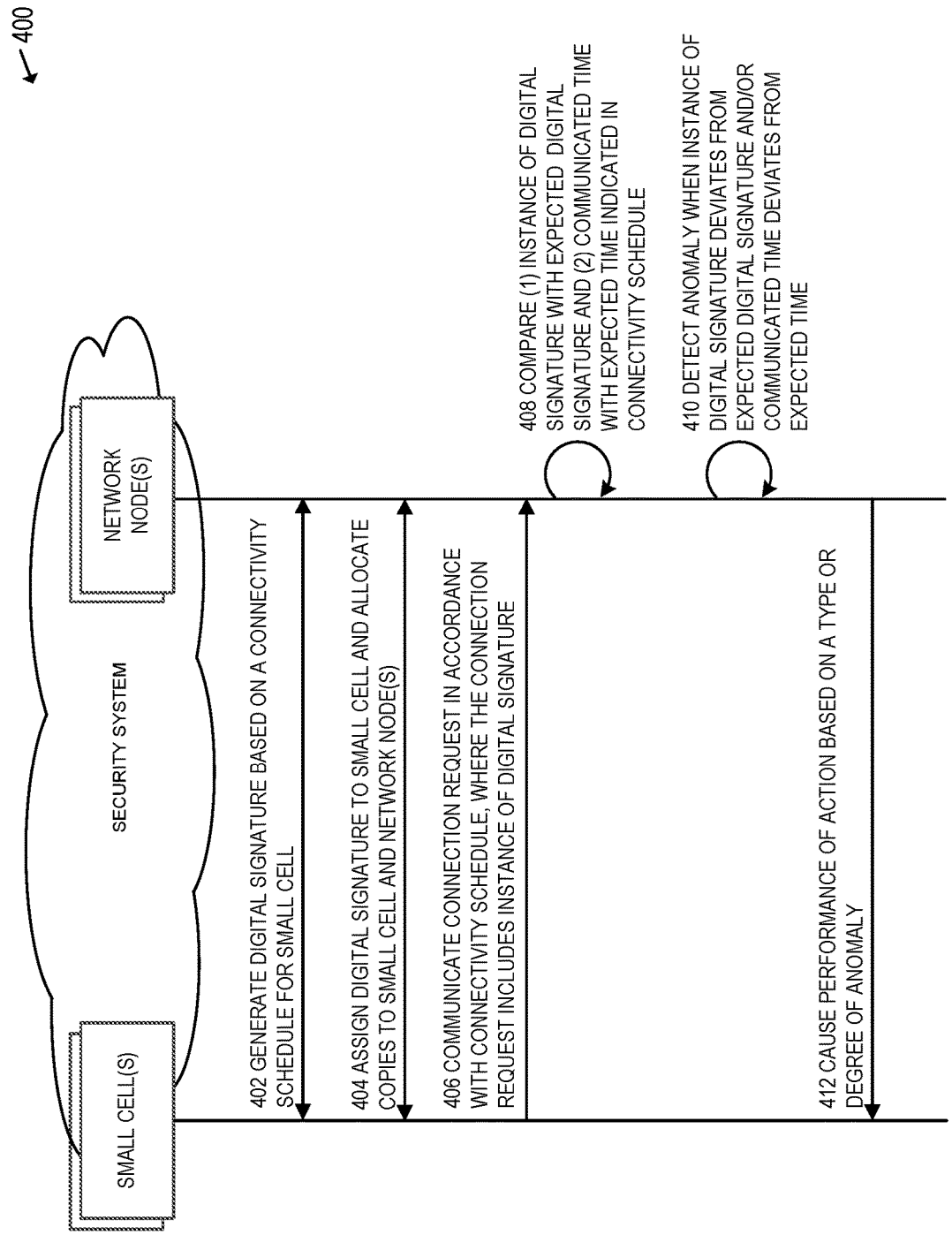
FIG. 4 is a flowchart that illustrates a process for generating a signature for a small cell and using the signature to detect an anomaly of a potential cyberattack.

FIG. 4 is a flowchart that illustrates a process 400 for generating a signature for a small cell and using the signature to detect an anomaly of a potential cyberattack. The process is performed by the security system ("system") which can include components of a wireless network (e.g., a 5G network) or components connected to the network. Implementations of the process 400 detect potential cyberattacks when a small cell seeks to connect to the network or while the small cell is actively connected to the network on an established link. The process 400 is generally described from an upstream network-side perspective for the sake of brevity; however, embodiments include counterpart or supplementary features or functions that are performed at the small cell.

At 402, the system generates a signature for the small cell. The signature is generated based on a connectivity schedule (or another schedule) indicating a pattern for communicating connection requests (or other requests on an established link), including copies of the signature, from the small cell to the wireless network. The system can process the connectivity schedule algorithmically (e.g., with an encryption algorithm) to generate the signature. The signature is unique among multiple small cells of the network because the pattern is unique among time frames of the multiple small cells. In one example, the multiple small cells belong to a group defined by a geographic region of the network.

At 404, the system assigns the signature to the small cell. The signature can be stored at the wireless network as an expected signature for the small cell. The system will grant the connection request including the correct signature communicated at an expected time. In one example, a copy of the connectivity schedule is stored at the security system in a plaintext format and another copy is stored at the small cell in an obfuscated format embedded in a copy of the signature. Hence, a hacker of the small cell could not readily obtain the connectivity schedule to impersonate the small cell. In another example, only a portion of the connectivity schedule is derivable at the small cell from a copy of the locally stored signature. The portion can include a next time for communicating a connection request.

At 406, the system receives a connection request from the small cell. The connection request includes an instance of a signature communicated at a point in time. That is, the small cell should communicate connection requests in accordance with the connectivity schedule. As indicated earlier, the small cell may obtain the entire connectivity schedule or only a next time to communicate a connection request. For example, the small cell can use a decryption key to extract only a next time for communicating a connection request from the connectivity schedule embedded in the locally stored signature.

At 408, the system compares the instance of the signature with the expected signature stored at the system and the point in time with an expected time indicated in the connectivity schedule. That is, the system compares the instance of the signature with the expected signature to determine whether the small cell communicated the wrong digital signature and compares the time when the instance of the signature was communicated to the expected time to determine whether the connection request conforms with the small cell's connectivity schedule. When either one of these elements or both deviate from expected values, the system detects an anomaly and even a potential cyberattack.

At 410, the system detects an anomaly when the instance of the signature deviates from the expected signature and/or the point in time deviates from the expected time. The system can classify an anomaly at a higher risk level when both an instance of the signature deviates from the expected signature and the point in time of the connection request deviates from the expected time. The system can classify another instance of the signature at a lower risk level when either (but not both) the instance of the signature deviates from the expected signature or the point in time for communicating the connection request deviates from an expected time. In another example, the system classifies anomalies as high risk when they satisfy conditions including that a received signature does not match the expected signature or a threshold number of instances of the signature are received from the small cell at unexpected times.

At 412, the system causes performance of an action based on a type or degree (e.g., high, moderate, low risk) of the anomaly. Examples of the action include monitoring the small cell for malicious activity during a temporary time period or altogether deauthorizing the small cell from connecting to the wireless network. Other examples include changing the small cell to an off state, erasing content stored at the small cell, disabling an application at the small cell, or temporarily disabling access of the small cell to the wireless network. In another example, the system can deauthorize the small cell until the system detects a threshold number of copies of the signature received at expected times as indicated in the connectivity schedule. In another example, the system deauthorizes the small cell when a first threshold number of instances of the correct signature are received at multiple unexpected times, and then re-authorizes the small cell when a second threshold number of instances of the correct signature are received at multiple expected times. The small cell can implement the deauthorization or re-authorization in accordance with instructions received from a network component.

The system can adapt dynamically to changes in a connectivity schedule of a small cell. For example, the system can generate a new signature based on a changed connectivity schedule. The new signature is assigned to the small cell for connecting to the wireless network. As such, the new signature is a new expected signature for detecting anomalies used to thwart cyberattacks.

Suitable Computer System

Figure 5:
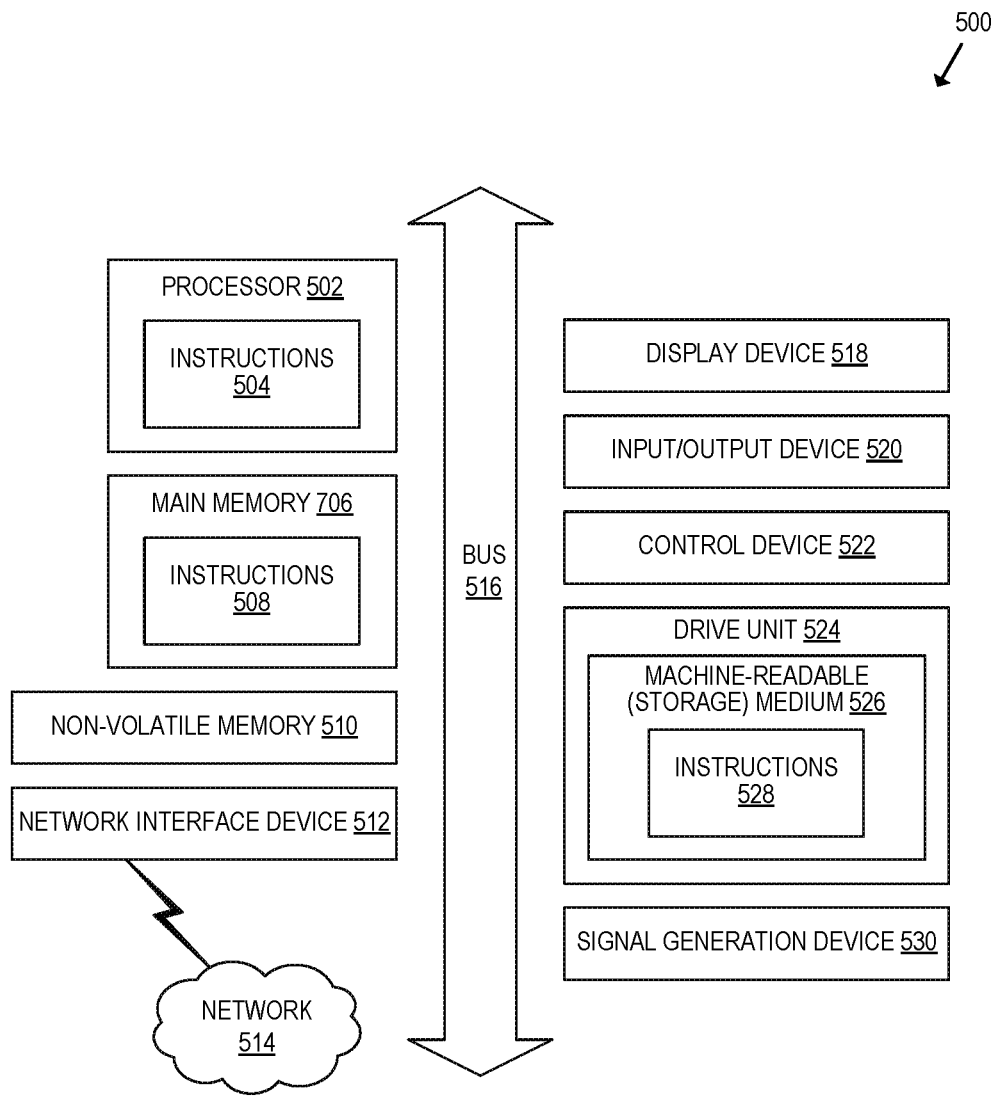
FIG. 5 is a block diagram that illustrates an example of a computing system in which at least some operations described herein can be implemented.

FIG. 5 is a block diagram that illustrates an example of a computer system 500 in which at least some operations described herein can be implemented. For example, components 300 of the security system or components of a small cell as discussed with respect to FIGS. 1-4 can include or host components of the computing system 500.

As shown, the computer system 500 can include one or more processors 502, main memory 506, non-volatile memory 510, a network interface device 512, video display device 518, an input/output device 520, a control device 522 (e.g., keyboard and point device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. The bus 516 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 5 for brevity. Instead, the computer system 500 is intended to illustrate a hardware device on which components illustrated or described relative to the examples of FIGS. 1-4 and any other components described in this specification can be implemented.

The computer system 500 can take any suitable physical form. For example, the computing system 500 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some embodiment, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The processor 502 can be, for example, a central processing unit, a conventional microprocessor (e.g., Intel Pentium processor). The memory (e.g., main memory 506, non-volatile memory 510, machine-readable medium 526) can be local, remote, or distributed. Although shown as single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. One of skill in the relevant art will recognize that the machine-readable medium 526 can include any type of medium that is accessible by the processor. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

Software is typically stored in the non-volatile memory and/or the drive unit 524. When software is moved to the memory for execution, the processor 502 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 512 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 520 include a keyboard, a mouse or other pointing device, disk drives, printers, a scanner, and other input and/or output devices, including a display device. Examples of the display device 518 can include a cathode ray tube (CRT), liquid crystal display (LCD), or any display device.

In operation, the computer system 500 can be controlled by operating system software that includes a file management system, such as a disk operating system. One example of operating system software with associated item management system software is the family of operating systems known as Windows® from Microsoft Corporation of Redmond, Washington, and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

The invention claimed is:

1. A non-transitory, computer-readable storage medium comprising instructions recorded thereon that, when executed by at least one data processor of a system of a wireless telecommunications network, cause the system to:
   assign a digital signature to a small cell of the wireless telecommunications network,
      wherein the digital signature is based on a connectivity schedule indicating a pattern for communicating connection requests, and
      wherein the digital signature and the connectivity schedule are unique among multiple small cells of the wireless telecommunications network;
   receive a connection request from the small cell,
      wherein the connection request includes an instance of a digital signature communicated at a point in time;
   detect an anomaly when (i) the instance of the digital signature deviates from the digital signature or (ii) the point in time deviates from an expected time; and
   cause performance of an action in response to the detected anomaly.

2. The non-transitory, computer-readable storage medium of claim 1, wherein the system is further caused to:
   process the connectivity schedule algorithmically to generate the digital signature.

3. The non-transitory, computer-readable storage medium of claim 1, wherein connectivity schedules of the multiple small cells are non-overlapping in a time domain.

4. The non-transitory, computer-readable storage medium of claim 1, wherein the multiple small cells belong to a group defined by a geographic region of the wireless telecommunications network.

5. The non-transitory, computer-readable storage medium of claim 1, wherein the connectivity schedule is determined through a machine learning process based on a condition of the wireless telecommunications network.

6. The non-transitory, computer-readable storage medium of claim 1, wherein a copy of the connectivity schedule is stored at the system in a plaintext format and another copy of the connectivity schedule is stored at the small cell in an obfuscated format embedded in a locally-stored copy of the digital signature.

7. The non-transitory, computer-readable storage medium of claim 1, wherein a copy of the connectivity schedule is stored at the wireless telecommunications network in a plaintext format and only portions of the connectivity schedule are derivable at the small cell from a locally-stored copy of the digital signature.

8. The non-transitory, computer-readable storage medium of claim 1, wherein the digital signature is stored at the wireless telecommunications network as an expected digital signature for the small cell.

9. The non-transitory, computer-readable storage medium of claim 1, wherein to detect the anomaly comprises causing the system to:
classify a first anomaly at a first risk level when a first instance of a digital signature deviates from the digital signature and a first point in time deviates from a first expected time; and
classify a second anomaly at a second risk level lower than the first risk level when either a second instance of a digital signature deviates from the digital signature or a second point in time deviates from a second expected time.

10. The non-transitory, computer-readable storage medium of claim 1, wherein to detect the anomaly comprises causing the system to:
classify the anomaly based on one or more conditions including:
an instance of a digital signature does not match the digital signature, and
a threshold number of instances of digital signatures do not match expected times indicated in the connectivity schedule.

11. The non-transitory, computer-readable storage medium of claim 1, wherein the system is further caused to:
change the connectivity schedule of the small cell;
generate a new digital signature based on the changed connectivity schedule; and
assign the new digital signature to the small cell for connecting to the wireless telecommunications network,
wherein the new digital signature is a new expected digital signature.

12. The non-transitory, computer-readable storage medium of claim 1, wherein the connection request is a first connection request and the instance of the digital signature is a first instance of a digital signature, the system is further caused to:
grant a second connection request when a second instance of a digital signature matches the digital signature and a second point in time associated with the second connection request satisfies an expected time.

13. The non-transitory, computer-readable storage medium of claim 1, wherein the action comprises causing the system to:
monitor the small cell for malicious activity during a temporary time period.

14. The non-transitory, computer-readable storage medium of claim 1, wherein the action comprises causing the system to:
deauthorize the small cell from connecting to the wireless telecommunications network.

15. The non-transitory, computer-readable storage medium of claim 1, wherein the action comprises causing the system to:
change the small cell to an off state,
erase content stored at the small cell,
disable an application at the small cell, or
temporarily disable access of the small cell to the wireless telecommunications network.

16. A system of a wireless network, the system comprising:
a data processor; and
a memory including instructions which, when executed by the data processor, cause the system to:
receive a communication from a small cell of the wireless network,
wherein the communication includes a copy of a digital signature received at a point in time by the system;
extract a connectivity schedule from the copy of the digital signature by processing the digital signature algorithmically;
detect an anomaly when (i) the copy of the digital signature deviates from an expected digital signature, or (ii) the point in time deviates from an expected time indicated in the connectivity schedule; and
initiate performance of an action in response to the detected anomaly.

17. The system of claim 16, wherein processing the digital signature algorithmically comprises causing the system to:
process the digital signature with a decryption algorithm to output the connectivity schedule.

18. The system of claim 16, wherein performing the action comprises causing the system to:
deauthorize the small cell until the system detects a threshold number of copies of the digital signature received at expected times as indicated in the connectivity schedule.

19. A method performed by a small cell of a telecommunications network, the method comprising:
receiving an expected digital signature for authorizing a connection to the telecommunications network,
wherein the expected digital signature embeds a schedule for connecting with the telecommunications network,
sending a communication at a point in time from the small cell to the telecommunications network,
wherein the communication includes an instance of a digital signature; and
performing one or more actions in response to an anomaly that was detected.

20. The method of claim 19, wherein performing the one or more actions comprises:
receiving instructions causing deauthorization of the small cell when a first threshold number of instances of the expected digital signature are sent at unexpected times; and receiving instructions causing re-authorization of the small cell when a second threshold number of instances of the expected digital signature are send at multiple expected times.

* * * * *